United States Patent
Vitenberg

(10) Patent No.: US 7,031,394 B2
(45) Date of Patent: Apr. 18, 2006

(54) COMMUNICATION SYSTEMS CONVEYING VOICE AND DATA SIGNALS OVER STANDARD TELEPHONE LINES

(75) Inventor: Roman Vitenberg, Holon (IL)

(73) Assignee: CopperGate Communications Ltd., Tel-Aviv (IL)

(*) Notice: Subject to any disclaimer, the term of this patent is extended or adjusted under 35 U.S.C. 154(b) by 913 days.

(21) Appl. No.: 09/839,205

(22) Filed: Apr. 23, 2001

(65) Prior Publication Data

US 2001/0033613 A1 Oct. 25, 2001

(30) Foreign Application Priority Data

Apr. 23, 2000 (IL) .............................................. 135794

(51) Int. Cl.
*H04B 14/04* (2006.01)
*H04K 1/10* (2006.01)
*H04L 27/28* (2006.01)

(52) U.S. Cl. .................................... 375/242; 375/260

(58) Field of Classification Search ............... 370/250, 370/485; 375/242, 260; 379/1.01
See application file for complete search history.

(56) References Cited

U.S. PATENT DOCUMENTS

| | | | |
|---|---|---|---|
| 5,608,725 A | | 3/1997 | Grube et al. |
| 5,889,856 A | | 3/1999 | O'Toole et al. |
| 6,141,330 A | * | 10/2000 | Akers ........................ 370/264 |
| 6,262,981 B1 | * | 7/2001 | Schmutz ..................... 370/347 |
| 6,466,572 B1 | * | 10/2002 | Ethridge et al. ............ 370/352 |
| 6,002,682 A1 | | 12/2002 | Bellenger et al. |
| 6,594,322 B1 | * | 7/2003 | Dapper et al. .............. 375/330 |
| 6,747,995 B1 | * | 6/2004 | Brown et al. ............... 370/493 |
| 6,763,097 B1 | * | 7/2004 | Vitenberg .................. 379/93.31 |
| 6,778,596 B1 | * | 8/2004 | Tzannes ...................... 375/222 |
| 2002/0009180 A1 | * | 1/2002 | Weirich et al. ............. 379/1.01 |
| 2002/0033416 A1 | * | 3/2002 | Gerszberg et al. .......... 235/380 |
| 2002/0101851 A1 | * | 8/2002 | Blake et al. ................. 370/352 |
| 2002/0118772 A1 | * | 8/2002 | Lin ............................. 375/285 |

FOREIGN PATENT DOCUMENTS

| | | |
|---|---|---|
| WO | WO 96/24989 A2 | 8/1996 |
| WO | WO 99/20027 A2 | 4/1999 |
| WO | WO 01/20864 A1 | 3/2001 |
| WO | WO 01/20865 A1 | 3/2001 |

OTHER PUBLICATIONS

Johansson, "ADSL Lite—The Broadband Enabler for the Mass Market" Ericsson Review, Ericsson, Stockholm, SE, No. 4, Dec. 22, 1998, pp. 154–161, XP000792054.

Colin et al., "QoS considerations for DMT–based ADSL and VDSL systems" Acoustics, Speech and Signal Processing, 1998. Proceedings of the 1998 IEEE International Conference on Seattle, WA, May 12–15, 1998, pp. 3437–3440, XP010279527.

* cited by examiner

*Primary Examiner*—Stephen Chin
*Assistant Examiner*—Harry Vartanian
(74) *Attorney, Agent, or Firm*—AlphaPatent Associates Ltd.; Daniel J. Swirsky

(57) ABSTRACT

A method for conveying over telephone lines digitized voice signals simultaneously with digital data signals by means of a communication system, having a transmitter having a discrete multi-tone unit yielding a plurality of carriers of different frequency, several of which are assigned to the voice signals and others to the data signals. The carriers for transmitting voice are selected on the basis of their signal-to-noise ratio characteristics, which carriers can be reallocated dynamically to data transmission. A first tone ordering circuit assigns data streams to data carriers, and a second tone ordering circuit assigns voice streams to voice carriers. Each carrier is modulated by QAM modulation, the data carriers by a sequence of QAM symbols representing data and the voice carriers by a sequence of QAM symbols representing voice. QAM modulation is carried out by a first constellation encoder that modulates the data carriers and a second constellation encoder that modulates the voice carriers.

13 Claims, 15 Drawing Sheets

COMMUNICATION SYSTEMS CONVEYING VOICE AND DATA SIGNALS OVER STANDARD TELEPHONE LINES

FIELD OF THE INVENTION

This invention relates generally to a method and to a communication system based thereon for simultaneously conveying over standard telephone lines both voice and digital data signals, and in particular to an arrangement in which these signals are conveyed by means of an asymmetric digital subscriber line over a single twisted pair telephone cable.

BACKGROUND OF THE INVENTION

In carrying out voice communication by means of a conventional telephone network, the telephone set at the premise of each subscriber is linked by a twisted pair cable to the central office of the network. This office acts to interconnect all subscribers to the network so that they can communicate with each other via twisted pair cables.

In this modern age of information, a typical telephone subscriber has available at his residence or office not only a telephone set but also a fax machine, a desktop computer and other electronic devices capable of transmitting and receiving digital data to and from other telephone subscribers in the network as well as to Internet websites and other sites capable of processing digital data.

In order to be able to transform an existing telephone network which conveys voice signals over twisted pair lines into a multi-media network it is known to provide for this purpose as asymmetric digital subscriber line (ADSL). An ADSL is a point-to-point connected circuit which affords each subscriber to the network with a high-speed communication link that in addition to the usual telephone services affords many other services such as video-on-demand, conference video phone communication and high-definition TV as well as a full range of Internet services.

When an ADSL is associated with a telephone network, it then becomes necessary to place a modem at either end of the existing twisted pair telephone line conveying the voice signals. This modem serves to establish the following three channels of information:

Channel A: a high-seed downstream channel running from the central office of the network to an end user.

Channel B: a medium-speed upstream channel running from the end user to the central office.

Channel C: a conventional voice channel, commonly referred to as POTS, meaning Plain Old, Telephone Service.

In this arrangement, voice channel A is segregated from data channels A and B by bandpass filters to assure uninterrupted voice telephone service even in the event of a circuit failure in the ADSL system.

Currently available are two ADSL systems which comply with current regulatory telephone standards, namely: a split-type ADSL and a splitterless type. In an ADSL of the split-type, also known as a Full-Rate type, the voice signals which are produced concurrently with the digital data signals are split therefrom and conveyed to the central station of the network over a twisted pair cable, whereas the data signals are conveyed over another twisted pair cable.

This split is effected by a POTS splitter placed at each end of the telephone line, the splitter being provided with a low bandpass filter to permit only voice signals to be supplied to one of the twisted pair lines, and a high bandpass filter to permit only digital line signals to be fed to the other twisted pair cable.

An ADSL of the split type cannot be installed in residences or offices having the usual two-wire internal telephone line wiring. It is necessary in order to install a split-type ADSL in these facilities, to provide an additional two wire line running from the modem to the splitter. Such rewiring substantially raises the expenses incurred in installing an ADSL system.

In a multiple apartment building the incoming telephone lines go into a central box in the building, from which box extend telephone lines leading to each apartment. The cost of rewiring this building to accommodate a split-type ADSL system could be considerable and possibly prohibitive.

Existing ADSL systems of the "splitterless" type which function to convey both digital data and voice signals simultaneously over a single twisted pair telephone cable include either a POTS splitter to separate the voice from the data or a POTS Line Card for this purpose. These are relatively expensive components.

In order to obviate the need to include a POTS splitter in the digital signal processor of ADSL, U.S. Pat. No. 5,889,856 discloses an Integrated ADSL Line Card capable of processing both data and voice signals on the same board. But while this ADSL Line Card reduces the total cost of the unit, the card is difficult to apply, for it must transmit a composite signal containing both the high-frequency digital data and low-frequency voice signals by way of the same driver circuits.

Another limitation of existing ADSL splitterless systems is that they include an interleaving device which introduces substantial delays in the transmission of digital data.

However the greatest practical drawback of existing splitter ADSL system is that it gives the telephone subscriber only a single baseband channel for voice communication. In many cases, this signal channel falls short of satisfying the subscriber's voice communication requirements.

SUMMARY OF THE INVENTION

In view of the foregoing, the main object of this invention is to provide a method and a communication system for carrying out the method adapted to convey simultaneously voice and digital data signals over a single twisted pair telephone cable whereby an existing telephone network can without rewiring be transformed into a multi-media network.

More particularly, an object of this invention is to provide a system of the above type which includes a splitterless asymmetric digital subscriber line (ADSL) that obviates the drawbacks of prior art ADSL systems.

A significant feature of an ADSL system in accordance with the invention is that it incorporates therein a discrete multi-tone (DMT) unit producing a plurality of carriers having different frequencies, some of which are modulated by digitized voice signals, other carriers being modulated by digital data signals, which voice and data-modulated carriers are conveyed over a common twisted pair telephone line without interference therebetween.

Briefly stated, a method in accordance with the invention and a communication system based thereon for conveying simultaneously both voice and data signals via a common twisted pair line includes a splitterless ADSL having incorporated therein a discrete multi-tone (DMT) unit. The DMT unit yields a plurality of carriers some of which are assigned to and modulated by digitized voice signals, others being assigned to and being modulated by digital data signals.

The DMT carriers for carrying the voice signals are selected on the basis of their signal-to-noise ratio characteristics and they can be reallocated dynamically for data transmission. A first tone ordering circuit assigns data streams to data carriers, and a second tone ordering circuit assigns voice streams to voice carriers. Each carrier is modulated by QAM modulation, the data carriers by a sequence of QAM symbols representing data, the voice carriers by a sequence of QAM symbols representing vice. QAM modulation is carried out by a first constellation encoder that modulates the data carriers and a second constellation encoder that modulates the voice carriers.

BRIEF DESCRIPTION OF THE DRAWINGS

For a better understanding of the invention as well as other objects and features thereof, reference is made to the annexed drawings wherein.

DETAILED DESCRIPTION OF THE INVENTION

Prior Art: An ADSL system for carrying out a communication method in accordance with the invention is of the splitterless type, thereby making it possible to convey both voice and data signals over a single twisted pair telephone cable.

Figure 1:
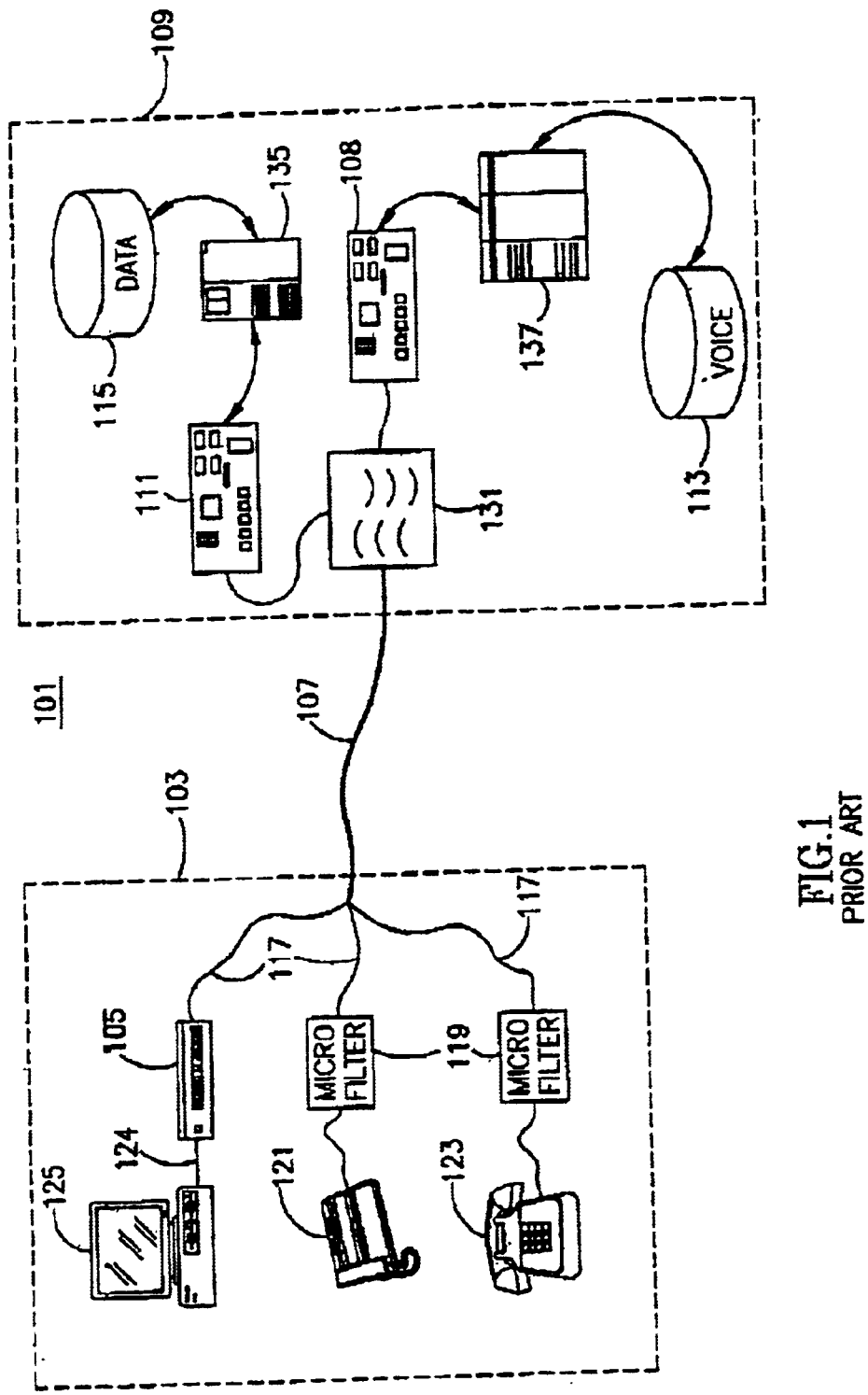
FIG. 1 is a block diagram of a prior art ADSL system of the splitterless type.
Figure 2:
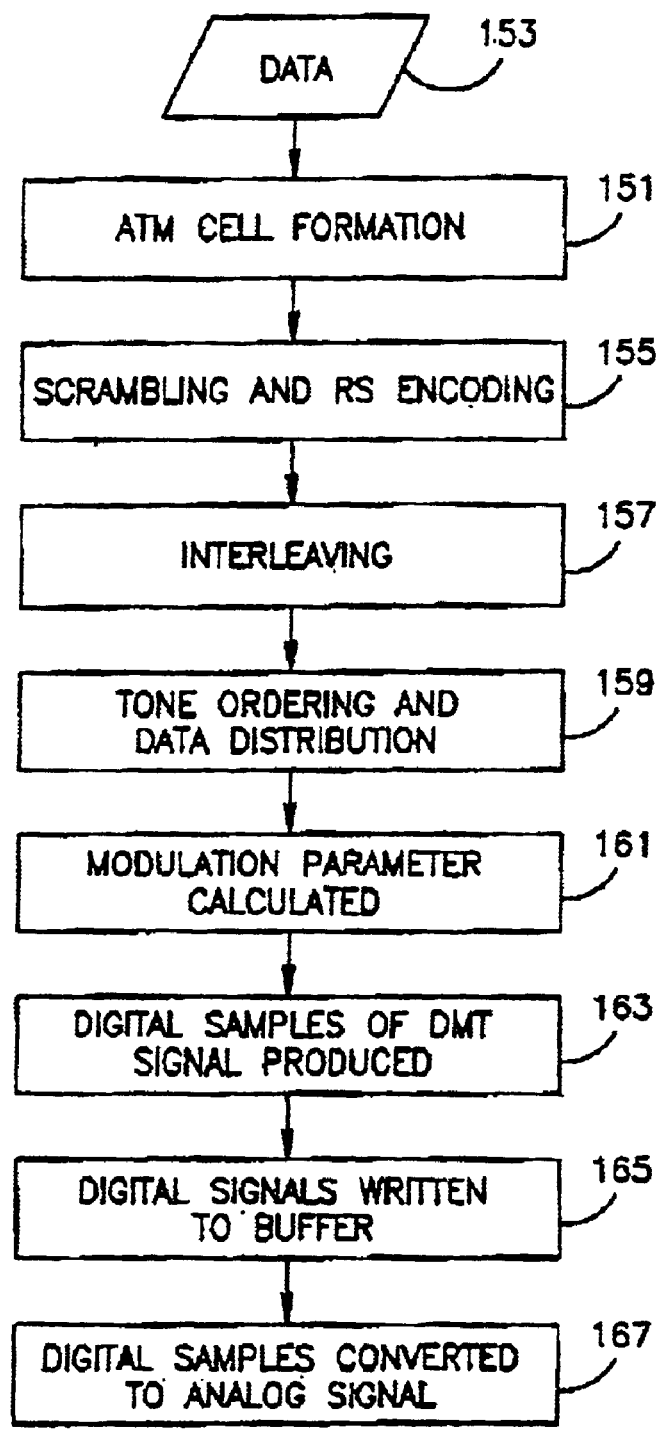
FIG. 2 is a flow chart of the processing steps carried out in a prior art system.
Figure 3:
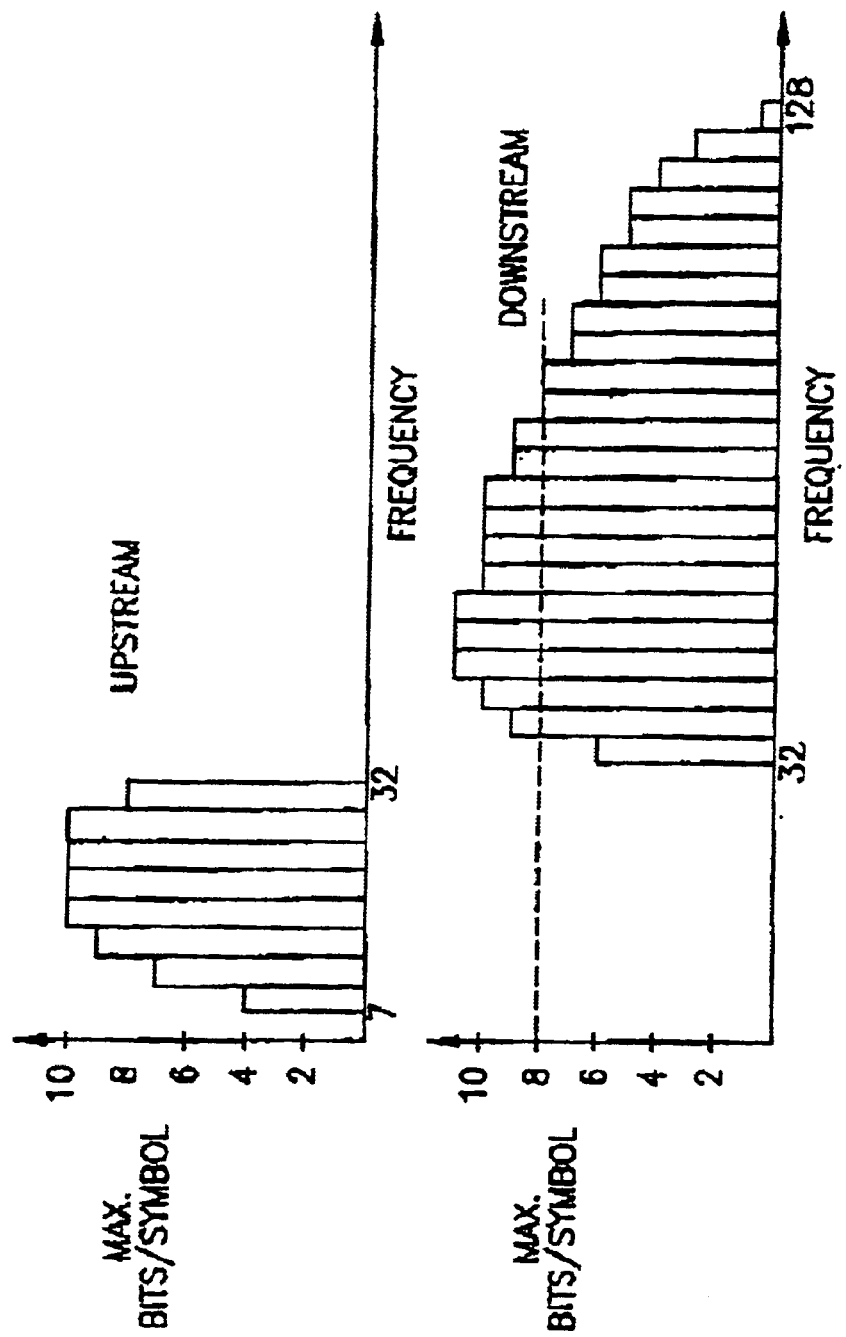
FIG. 3 shows the frequency spectrum of the upstream and downstream carriers in the prior art system.
Figure 4:
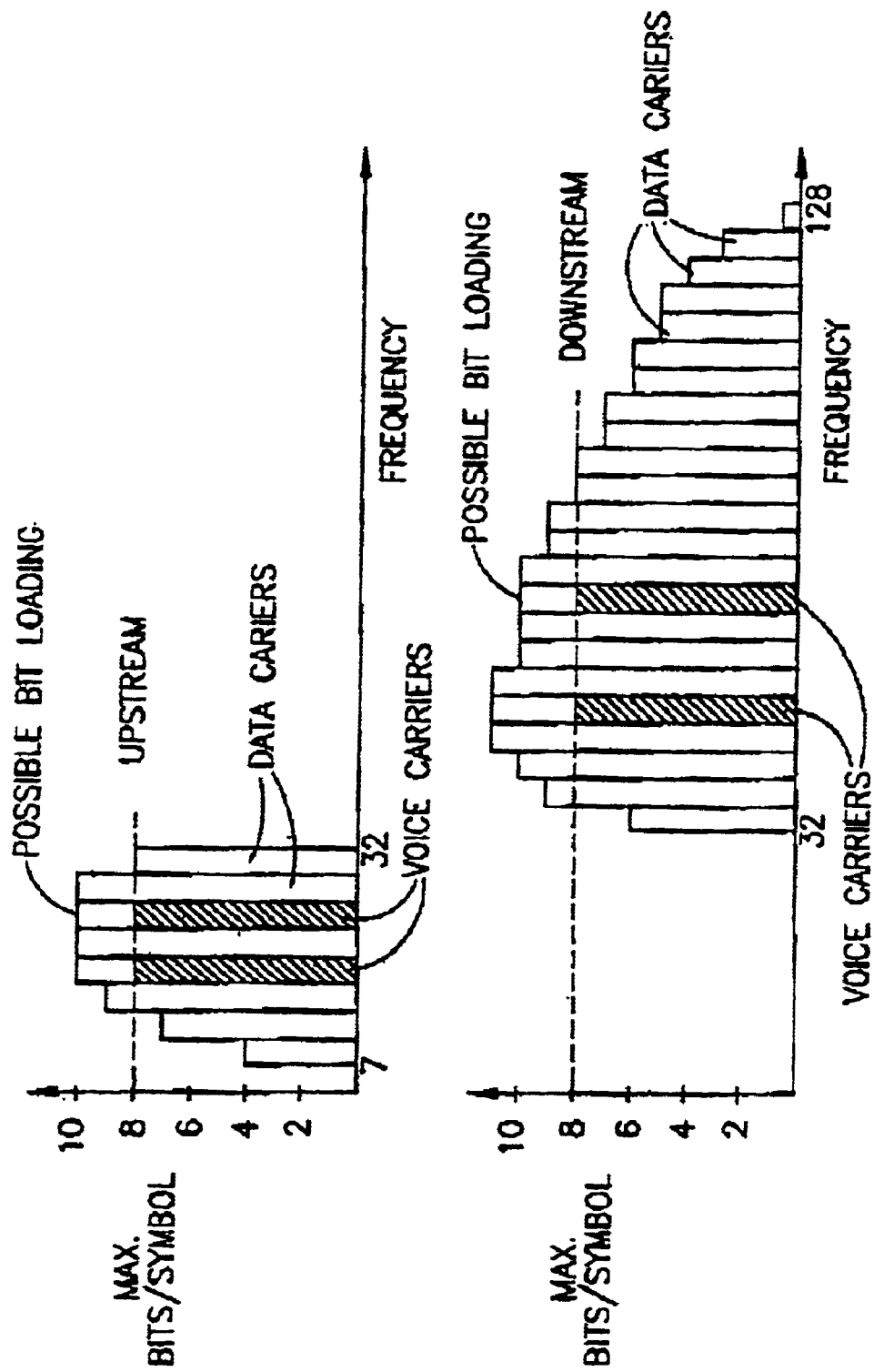
FIG. 4 is a frequency spectrum graph showing bit loading of carriers in a system in accordance with the invention.

In as much as the present system is an improvement over a prior art ADSL system of the splitterless type and uses many of the same components, the present system and its advantages over an existing system can best be understood by first considering the prior art system illustrated in FIGS. 1, 2 and 3.

FIG. 1 is a block diagram illustrating an existing splitterless ADSL system 101. The subscriber premises is connected to a central office 109 (CO) by a twisted wire pair telephone cable 107. At subscriber premises 103, the twisted wire pair 107 is connected to a fax machine 121, to a telephone set 123, and to a remote ATU-R 105 (ADSL Transceiver Unit), using for this purpose internal telephone lines 117. ATU-R unit 105 is connected directly to a telephone line 117 and to a PC 125 (personal computer) by an Ethernet cable 124. The fax machine 121 and telephone set 123 are connected to telephone line 117 by microfilter 119. Central office 109 includes an ATU-C 111 (CO ADSL Transceiver Unit), a POTS-splitter 131, a POTS Line Card 108, a data switch 135, a telephone switch 137, a data network 115, and a telephone network 113.

The subscriber twisted pair 107 is coupled to POTS-splitter 131 which separates data and voice signals. The data signals pass through data switch 137 to ATU-C transceiver 111. Voice signals from voice network 113 go through a POTS Line Card 108 via telephone switch 137.

Voice signals are conveyed via telephone switch 137 and through POTS splitter 131 as baseband signals from which they are applied to twisted pair 107. Data signals conveyed through data switch 135 are modulated in a frequency range higher than that of the base band POTS signals and are applied through POTS splitter 131 to twisted pair wire 107. Since the data communication signals are transmitted in a frequency range different from that of the voice communication signals, FDM (frequency-division-multiplexing) makes possible simultaneous transmission of both POTS signal and data communications over the same single twisted pair 107.

FIG. 2 is a flow chart of the processing steps carried out in an ATU (ADSL Transceiver Unit) referenced in ITU (International Telecommunications Union) recommendation G.992.2, referring to the splitterless ADSL.

Data 153 is processed in ATM Cell Formation step 151 by an interface port resulting in a sequence of ATM (Synchronous Transfer Mode) cells. In step 155 the cells are RS (Reed-Solomon) encoded and scrambled. The ADSL system employs FEC (Forward Error Correction) based on RS encoding to reduce the effect of the impulse noise. In step 157 an interleaver mixes data bits to protect the encoded data cells from impulse noise. In step 159 tone ordering is calculated for the interleaved encoded data and the data is distributed among 128 tones (carriers) of multitone line signal. In step 161, modulation parameters are calculated by a constellation encoder and a gain scaler for each carrier. In step 163 the modulation parameters of all carriers are transformed by an IDFT (Inverse Discrete Fourier Transformation) processing to produce digital samples of DMT (Discrete MultiTone) signals. In step 165 the digital samples are written into an output buffer. In step 167 a DTA (Digital To Analog) converter transforms the digital samples to analog DMT line signal.

The ADSL is an adaptive system. During an initialization communication phase, an ADSL system measures the SNR (signal-to-noise ratio) for each carrier and defines the number of bits that may be loaded on the carrier.

FIG. 3 illustrates the frequency spectrum of the ADSL carriers, the figure showing a typical graph of ADSL downstream and upstream carriers (shown on the graph as bars) bit per symbol loading. In practice, for cable length of up to 9000 feet, many carriers may be loaded with a high number of bits per symbol (up to 12–14 bits).

As previously pointed out, an existing ADSL system of the type shown in FIG. 1 has several drawbacks. The most serious of which is that the system provides the telephone subscriber with only a single base band voice channel which for many subscribers is inadequate. The inclusion of a POTS Line Card in this prior art system adds substantially to its cost.

The Invention: In a method in accordance with the invention and in a splitterless ADSL system for carrying out this method to convey voice and data signals simultaneously over a single twisted pair telephone cable, the disadvantages of prior art systems are overcome, particularly in regard to voice transmission. Instead of a single voice channel, an ADSL system in accordance with the invention has incorporated therein several high-quality telephone channels.

The multi-tone modulation technique included in a system in accordance with the invention acts to separate the available bandwidth into a multiplicity of distinct carriers, each functioning as a communication channel. This makes it possible to convey voice and digital data signals simultaneously on different channels. In practice the DMT-ADSL splitterless system for short distances such as 9000 feet can support up to 8 telephone channels upstream with a bit rate of up to 250 Kb/s, and downstream with a bit rate of up to 6 Mb/s.

Two upstream carriers and two downstream carriers are utilized for one voice channel which are hereinafter called "voice carriers" (VCs). The VCs are not predetermined before the onset of communication. During an initialization process, the ADSL system measures the (SNR) signal-to-noise ratio for each carrier and defines the number of bits that may be loaded on respective carriers. Two downstream and two upstream carriers having the highest SNR which are capable of carrying more than 8-bits are then assigned for voice transmission. The selected carriers can carry more than 8 bits for each symbol. Nevertheless, they are only loaded with 8 bit symbols, as can be seen in black shading in the graph.

The assignment of VCs does not interfere with the ADSL function because the working standard does not imply a definite number of carriers for use in data transmission, a situation which likewise allows disabling of some carriers with low SNR by the ADSL transmitter during the intialization process. In accordance with the present invention VCs assigned by the ADSL system are not used for data transmission. The ADSL system can therefore utilize the other DMT carriers for data transmission in accordance with G.992.2 standard.

Before being transmitted, a voice signal is converted by a PCM (Pulse Code Modulation) encoder into a 8-bit digital words with frequency of 8 kHz in accordance with existing standard for PCM telephone system (ANSI T1 or E1).

Figure 5:
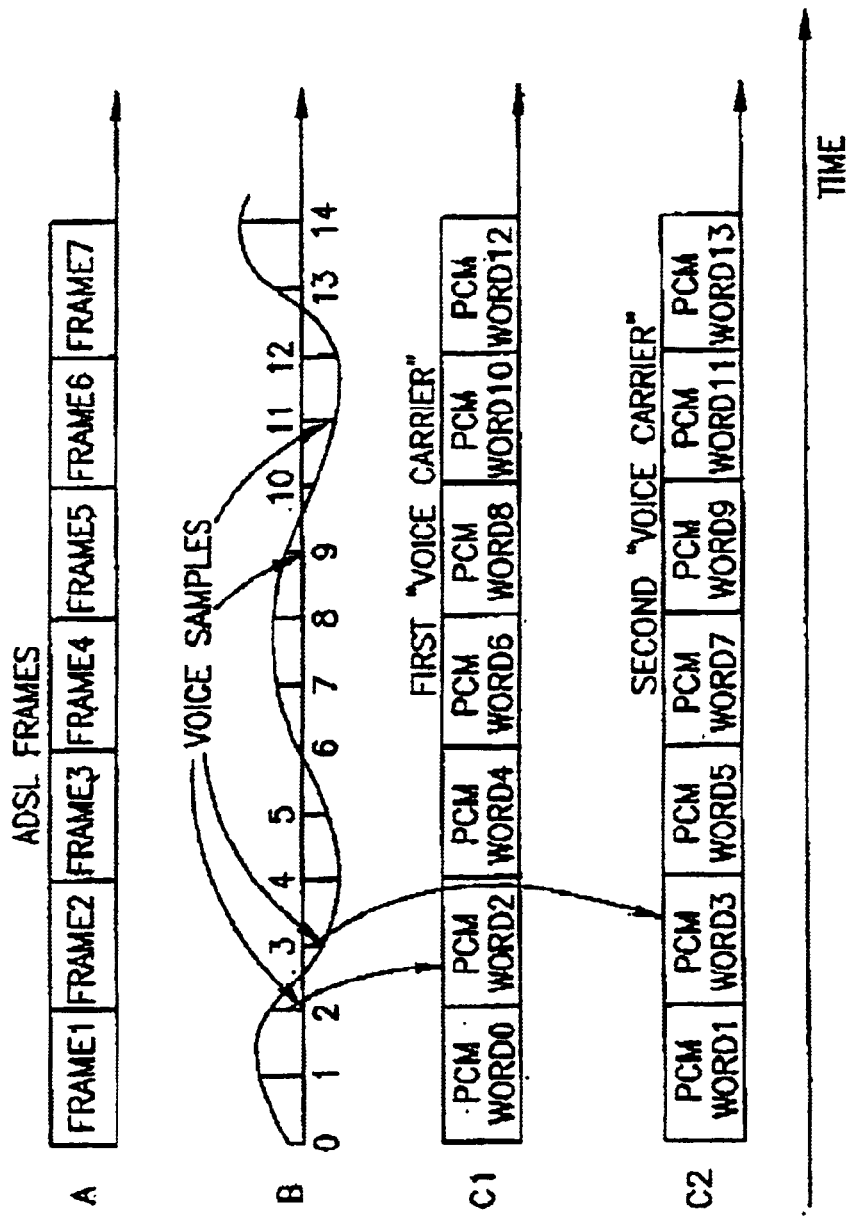
FIG. 5 is a time base diagram illustrating synchronization of the voice encoder with the frame rate of the ADSL system.

Referring to FIG. 5 shown therein is a time base diagram illustrating the correlation between the PCM encoded voice signal and the DMT frames. Because the sampling rate of the PCM encoder is 8 kHz and the DMT-ADSL frames shown in row A operate as a frequency of 4 kHz, it is necessary to use two upstream VCs and two downstream VCs for transmitting one telephone channel. In row B, voice signal samples 2 and 3 are assigned to two different VCs in row C1 and row C2 which correspond exactly to the DMT-ADSL frames in row A. The PCM encoder is therefore synchronized with the DMT-ADSL frame rate.

Each carrier of the DMT-ADSL system undergoes modulation by a sequence of QAM symbols. This is achieved by operating a QAM constellation encoder. Each 8-bit PCM word is transformed in to 8 bit QAM vector, following which odd QAM symbols modulate a first VC, and even QAM symbols modulate a second VC.

Figure 6A:
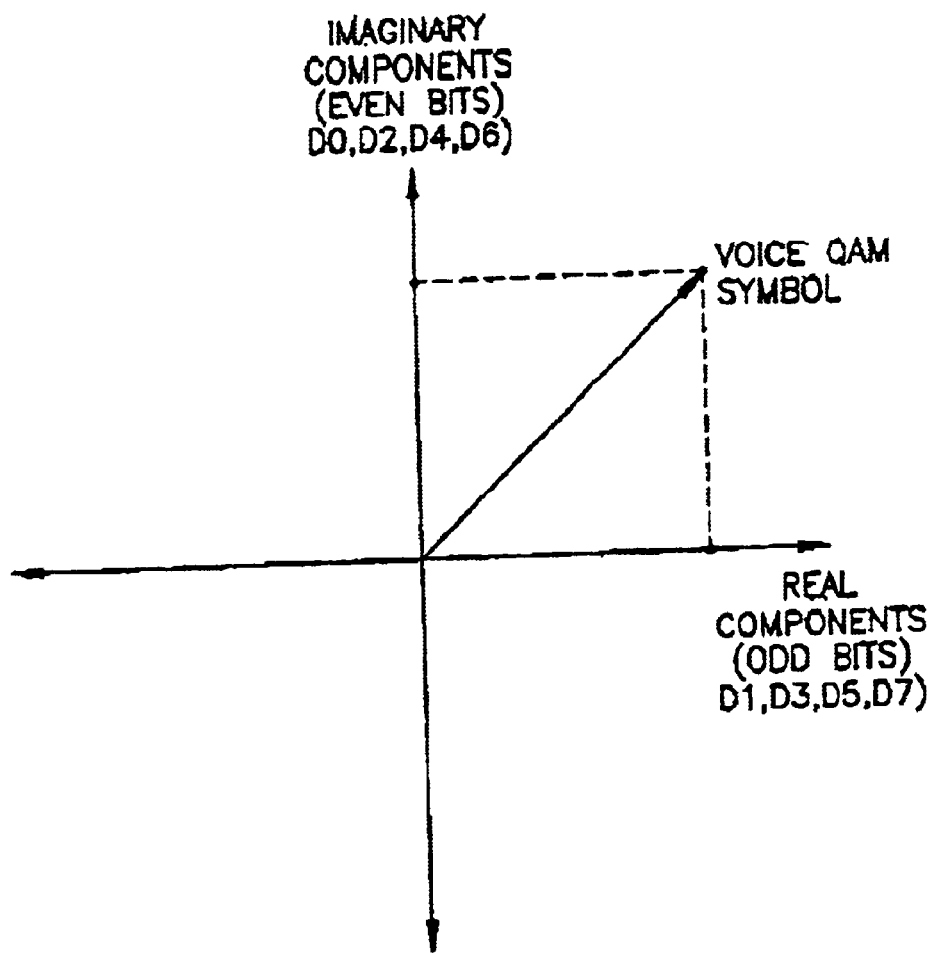
FIG. 6A schematically illustrates a constellation pattern of PCM words and a derived QAM vector.

FIG. 6A illustrates the derivation of a QAM vector in the context of a constellation encoder according to the present invention. The constellation encoder calculates real and imaginary components of the QAM vector using odd bits of PCM word for the real component of the vector, and even bits of PCM word for the imaginary component of this vector.

Figure 6B:
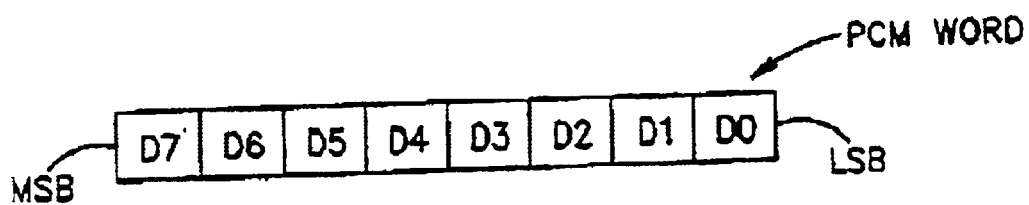
FIG. 6B schematically illustrates the bit significance in a PCM word derived from a voice channel.

As can be seen in FIG. 6B, the more significant bits of a PCM word correspond to the more significant bits of real and imaginary components of the respective QAM vector. Errors may be produced by channel noise only in the less significant bits of the PCM words because of the short distance between consecutive QAM vectors. As a result, errors in low significant bits of PCM words produce only small additional noise in the voice signal. As a consequence, the present invention promotes a high quality voice signal transmission over an ADSL system without implementing error correction coding and without significant delay. An ADSL communication system in accordance with the invention may be extended to effect simultaneous transmission of several voice channels.

Figure 7:
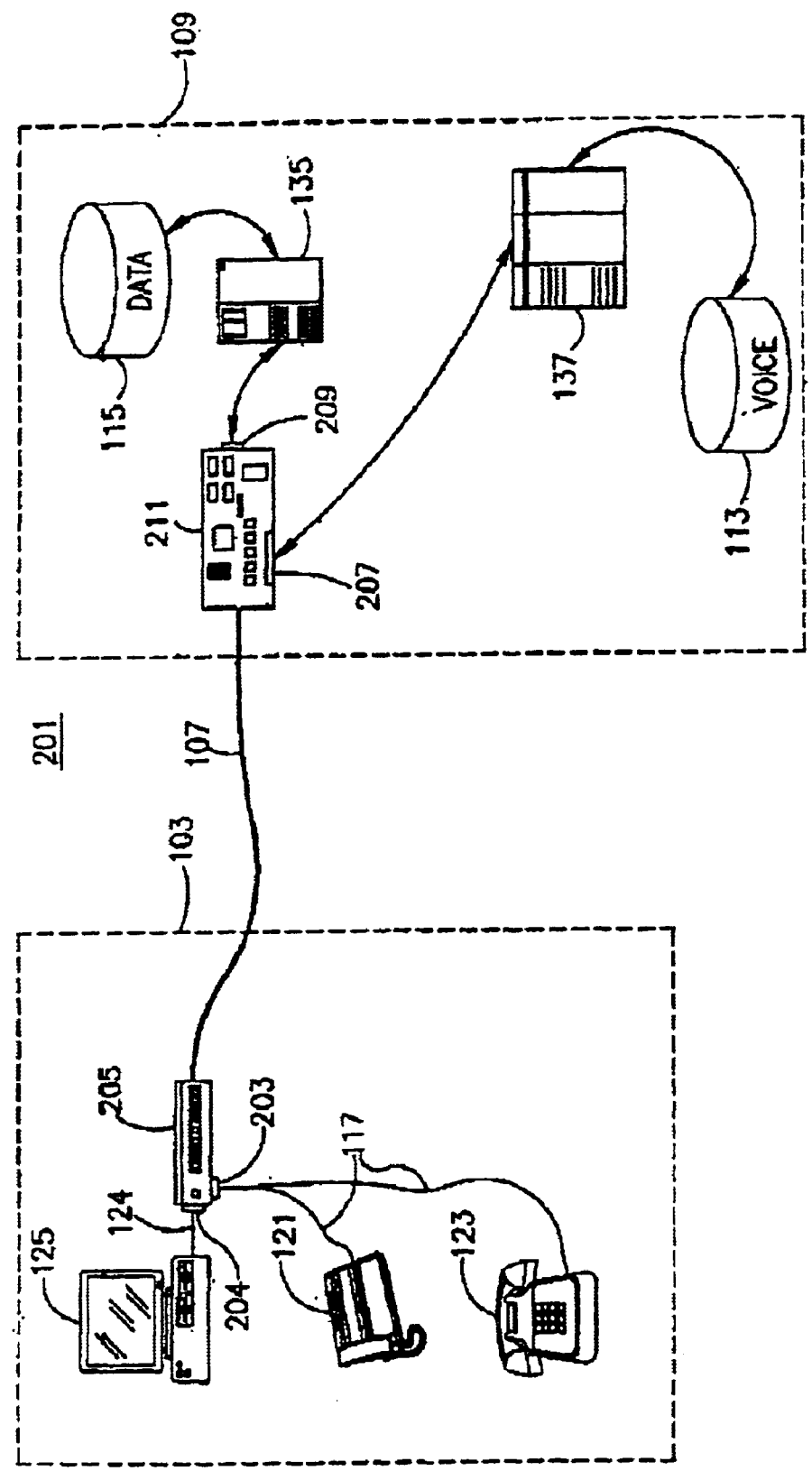
FIG. 7 is a block diagram showing a subcentral station and a central station in an ADSL system in accordance with a preferred embodiment of the invention.

The Basic System: FIG. 7 illustrates schematically a communication system 201 in accordance with a preferred embodiment of the present invention. A subscriber premise 103 is coupled to the CO (central office) 109 of a telephone network by a twisted wire pair telephone cable 107. At the subscriber's premise 103, the twisted wire pair 107 is connected to ATU-R transceiver unit 205. A fax machine 121 and a telephone set 123 are connected to a voice interface port 203 of ATU-R 205, using for this purpose internal telephone lines 117. A PC (personal computer) 125 is connected to a digital interface port 204 of ATU-R 205 by an Ethernet cable 124.

Central office 109 contains an ATU-C transceiver unit 211, a data switch 135, a telephone switch 137, a data network 115, and a telephone network 113. A subscriber twisted pair cable 107 is coupled directly to ATU-C 211 and carries data and voice on (DMT) discrete multi-tone line carriers. Data signals flow from data interface port 209 of ATU-C 211 to the data switch 135. Voice signals flow from voice interface port 207 of ATU-C 211 to telephone switch 137. Telephone switch 137 is coupled to telephone network 113 whereas data switch 135 is coupled to data network 115.

The communication system 201 shown in FIG. 7 does not entail an expensive POTS-splitter nor a POTS Line Card. In accordance with the present invention, voice signals are transmitted in digital form using a portion of the capacity of the ADSL link. System 201 uses for transmitting voice and data signals different carriers (VCs and "data carriers" respectively) of the DMT-ADSL line signal.

Figure 8A:
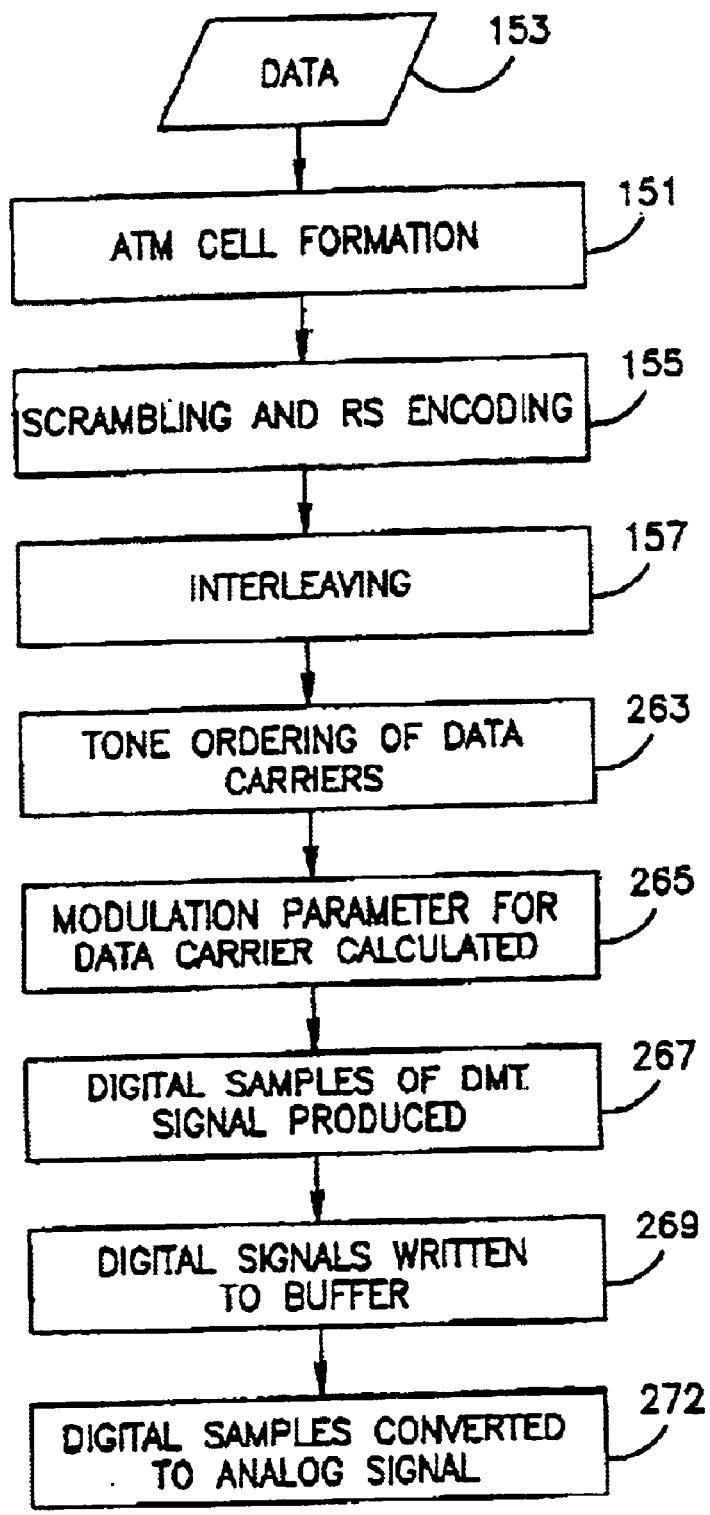
FIG. 8A is a flow chart illustrating a sequence of data processing events in this preferred embodiment.

Data Processing: FIG. 8A is a flow chart of the data processing steps implemented in an ATU transmitter (ADSL Transceiver Unit) according to the present invention. Data 153 is processed in step 151 by an interface port resulting in a sequence of ATM (Asynchronous Transfer Mode) cells. In step 155 these cells are scrambled and RS encoded. In step 157, an interleaver mixes data bits to protect the encoded blocks of data from impulse noise. In step 263 tone ordering is calculated for the interleaved encoded data and the data is distributed to 128 tones or carriers of the multitone line signal.

In step 265, modulation parameters are calculated by a constellation encoder and a gain scaler for each data carrier. In step 267 the modulation parameters of all carriers are transformed by IDFT (Inverse Discreet Fourier Transformation) processing to produce digital samples of the DMT (Discrete MultiTone) signal. In step 269 the digital samples are written into an output buffer. In step 272 a DTA (Digital To Analog) converter transforms the digital samples to an analog DMT line signal.

Figure 8B:
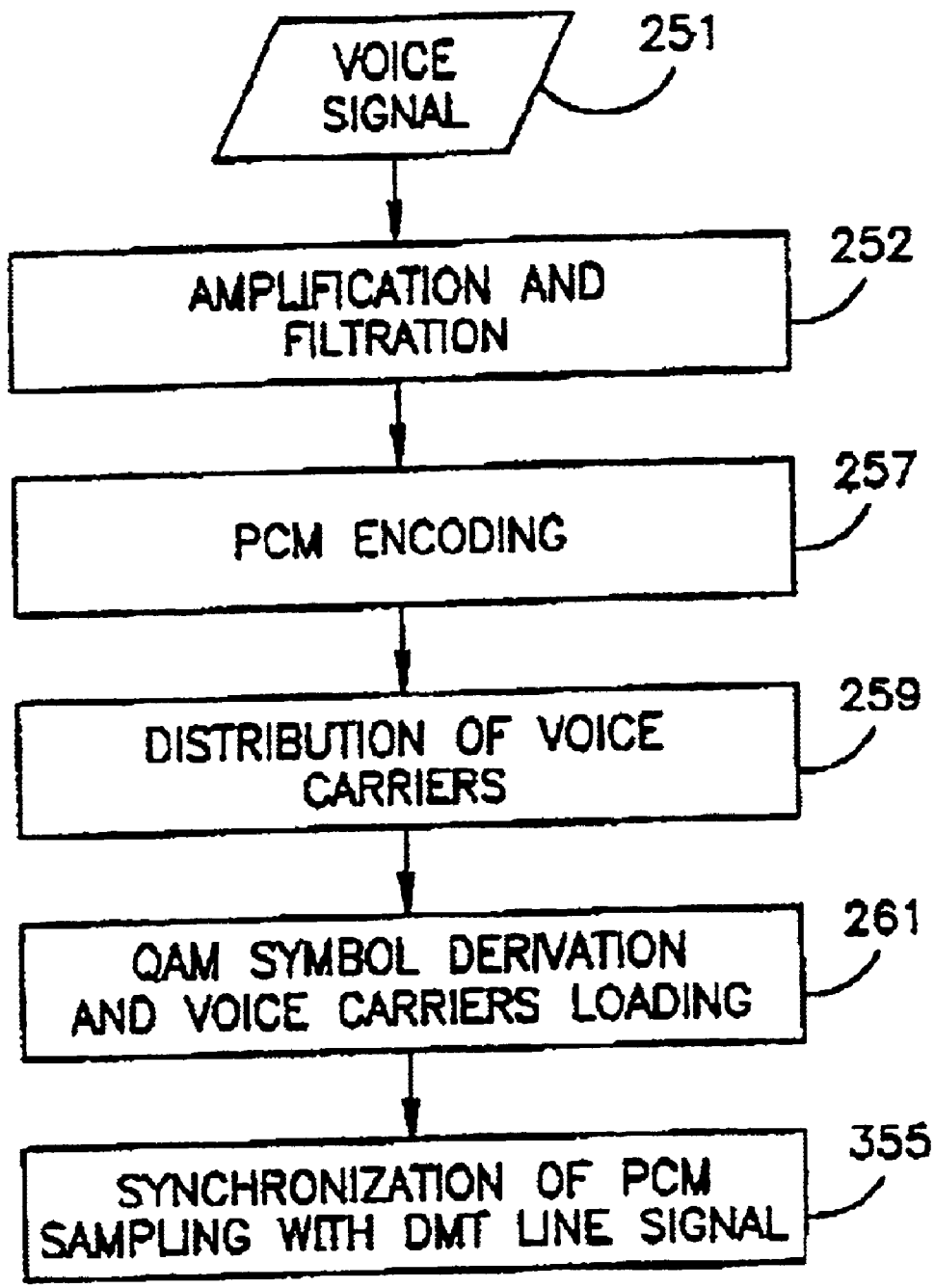
FIG. 8B is a flow chart illustrating a sequence of the voice processing events in this preferred embodiment.

Voice signal 251 undergoes a different set of processing steps. FIG. 8B shows schematically the sequence of these processing events within the ATU. In step 252, the signal is amplified and filtered by a voice interface port. In step 257 the voice signal is transformed by PCM encoding into a 64 kbit/sec sequence of 8-bit PCM words, the sampling rate of the PCM encoder is 8 kHz. It uses for this purpose standard A-Law OR μ-Law coding, identical to the routine used by the PCM telephone systems ANSI T1 or E1. In step 259, tone ordering is calculated for the PCM word stream, and the PCM stream is distributed between two VCs of the DMT SIGNAL. In step 261 each 8-bit PCM word is transformed into one 8-bit QAM symbol by a VCs constellation encoder and gain-scaler. A fixed 8-bit loading on each "voice carrier" is then provided. In step 355 the sampling of the PCM encoder is synchronized with the frames of the DMT line signal.

Data and multiple voice channels: An ADSL transmitter in accordance with the invention can support a number of telephone channels. Data is processed in the ATU transmitter along the same lines set forth in FIG. 8A. Data 153 is processed in step 151 by an interface port resulting in a sequence of ATM cells. In step 155 the cells are scrambled and RS encoded. In step 157 an interleaver mixes data bits to protect the encoded blocks of data from impulse noise. In step 263 tone ordering is calculated for the interleaved encoded data and the data is distributed to data carriers of the multitone line signal. In step 265 modulation parameters are calculated by a constellation encoder and a gain scaler for each carrier. In step 267 the modulation parameters of all the carriers are transformed by IDFT processing to produce digital samples of DMT (Discrete MultiTone) signal. In step 269 the digital samples are written into an output buffer. In step 272 a DTA converter transforms the digital samples to analog DMT line signal.

Figure 9:
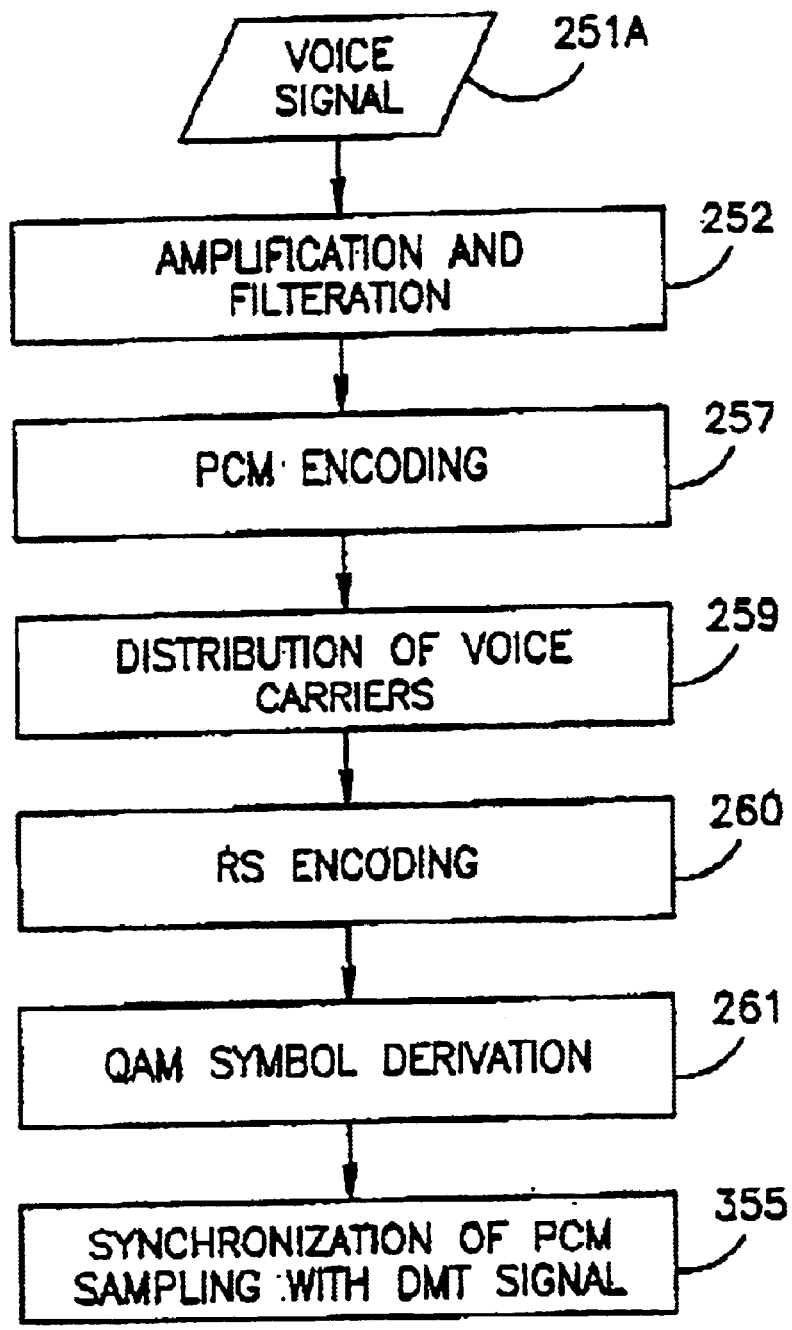
FIG. 9 is a flow chart illustrating the sequence of the voice processing events in a multi-voice channel in the transmitter.

FIG. 9 illustrates the sequence of processing events which a voice signal that is one of several incoming signals undergoes in the ATU transmitter, starting with a voice signal 251A flowing into an individual interface port. In step 252, the signal is amplified and filtered by one of the interface ports available. In step 257 the voice signal is transformed by PCM encoding into a 64 kbit/sec sequence of 8-bit PCM words, the sampling rate of the PCM coder is 8 kHz using for this purpose standard A-Law or μ-Law coding, much the same as is used by the PCM telephone systems ANSI T1 or E1.

In step 259, tone ordering is calculated for the PCM word stream, and each 64 kb/sec PCM stream is distributed between two VC's or DMT signal. In step 260 parity bytes are calculated by an RS encoder for PCM words of all the voice channels, which are then loaded on an additional "voice carrier ". In step 261 each 8-bit PCM word is transformed into one 8-bit QAM symbol by a VCs constellation encoder and gain-scaler. A fixed 8-bit loading on each "voice carrier" is consequently provided. In step 355 the sampling of the PCM encoder is synchronized with the frames of the DMT line signal.

Figure 10A:
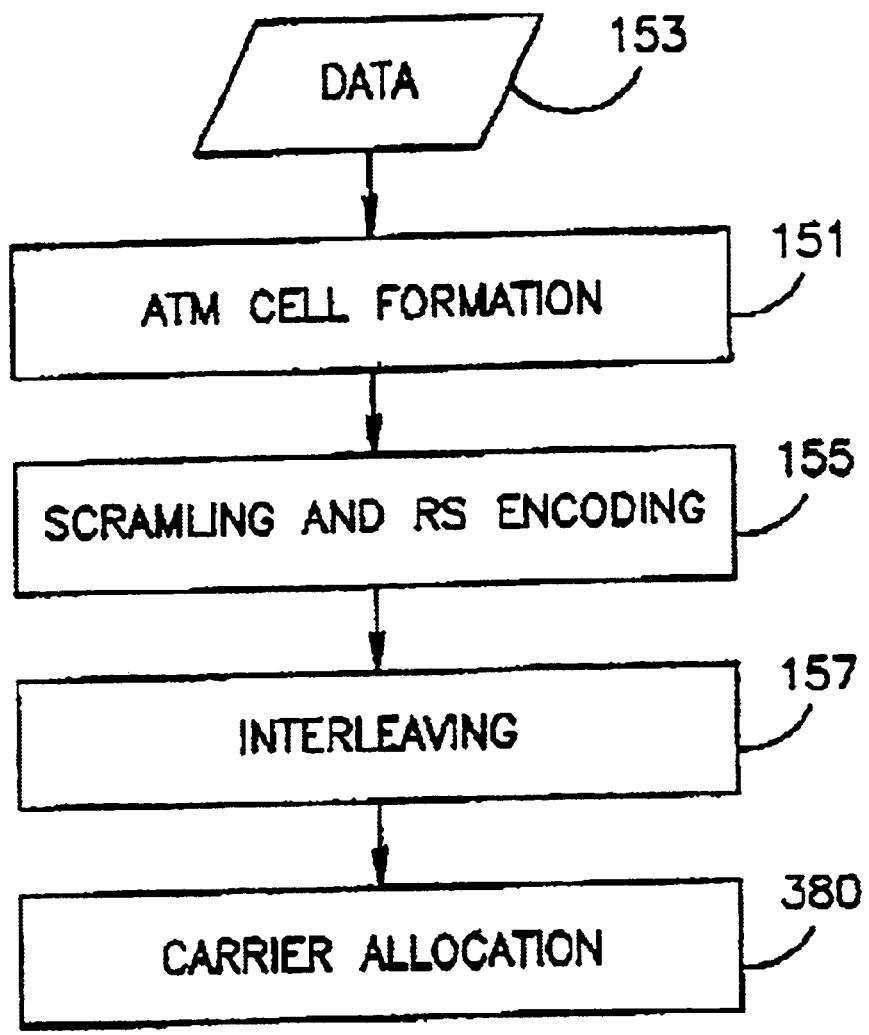
FIG. 10A is a flow chart illustrating the sequence of processing events in data processing in the transmitter.

Data communication over silent voice carriers: FIG. 10A illustrates the sequence of processing events involved in data processing within the ATU transmitter in accordance with another embodiment of the present invention. Data 153 is processed in step 151 by an interface port resulting in a sequence of ATM cells. In step 155 the cells are scrambled and RS encoded. In step 157 an interleaver mixes data bits to protect the encoded blocks of data from impulse noise. In step 380, the interleaved data stream is distributed between "data carriers" and silent VCs.

Figure 10B:
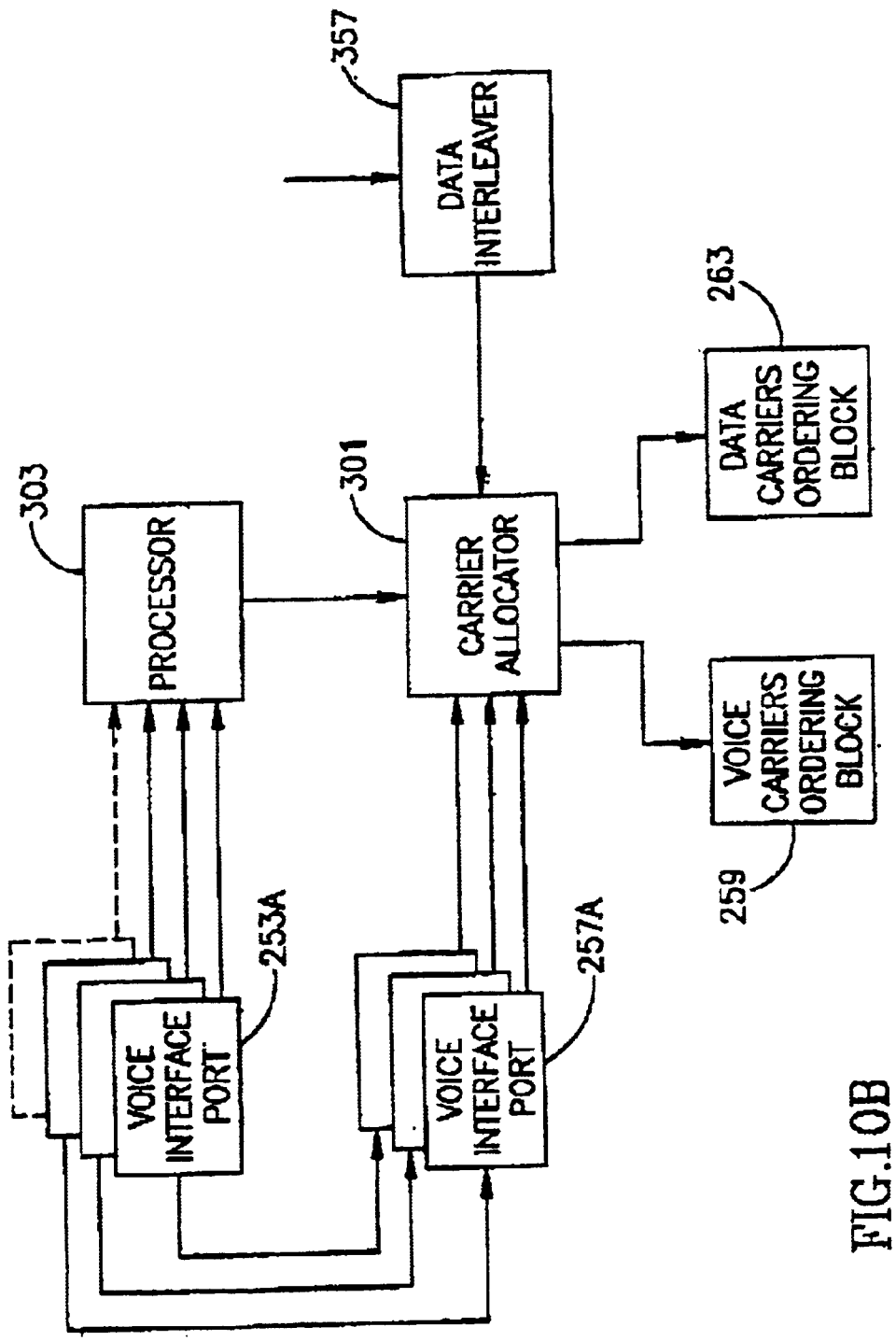
FIG. 10B is a block diagram illustrating dynamic allocation of void carriers.

To illustrate the way in which the allocation of data carriers is interactively changed, reference is now made to the embodiment of the invention shown in FIG. 10B which illustrates the voice processing block layout in a dynamic VCs allocating procedure. A carrier allocator 301 receives allocation instructions from a processor 303. This processor conducts periodic analyses of the voice signals at voice interface port 253A. Upon the identification of a silent voice channel, it instructs carrier allocator 301 to reassign the respective VCs to data communication, in addition to those assigned to data exclusively. Interface ports 253A and the others, amplify and filter the corresponding voice signals respectively. PCM encoders such as 257A sample the voice signal coming from the corresponding voice interface port at a sampling rate of 8 kHz, transforming the analog voice signal into a 64-kbit/sec sequence of 8-bit PCM words. Each PCM encoder uses standard A-Law or μ-Law coding, the same used in PCM telephone systems ANSI T1 or E1. The PCM words of active voice channels pass then to carrier allocator 310 and then to VCs tone-ordering block 259 that distributes each 64 kbit/sec PCM word stream of busy telephone channels between two VCs of DMT signal. Carrier allocator 301 passes on to the "voice carriers" tone ordering block 259 only those PCM signals originating from such PCM encoders that are connected to active voice interface ports. Inactive PCM coders that are not currently in use by telephone lines are not connected to "voice carriers" tone ordering block 259.

A RS encoder calculates parity bytes for PCM words of active voice channels and puts these parity bytes on additional "voice carrier". A VCs constellation encoder and gain-scaler transforms each 8-bit PCM word into one 8-bit QAM symbol and provides fixed 8-bit loading on each "voice carrier". The sampling rate of each PCM coder is synchronized with the frame rate of the DMT line signal.

A communication system in accordance with this embodiment of the invention can potentially transmit more data because a portion of the telephone channels which is not busy, for example during off-peak hours, can be utilized for communicating data coming from data interleaver 357.

Figure 11:
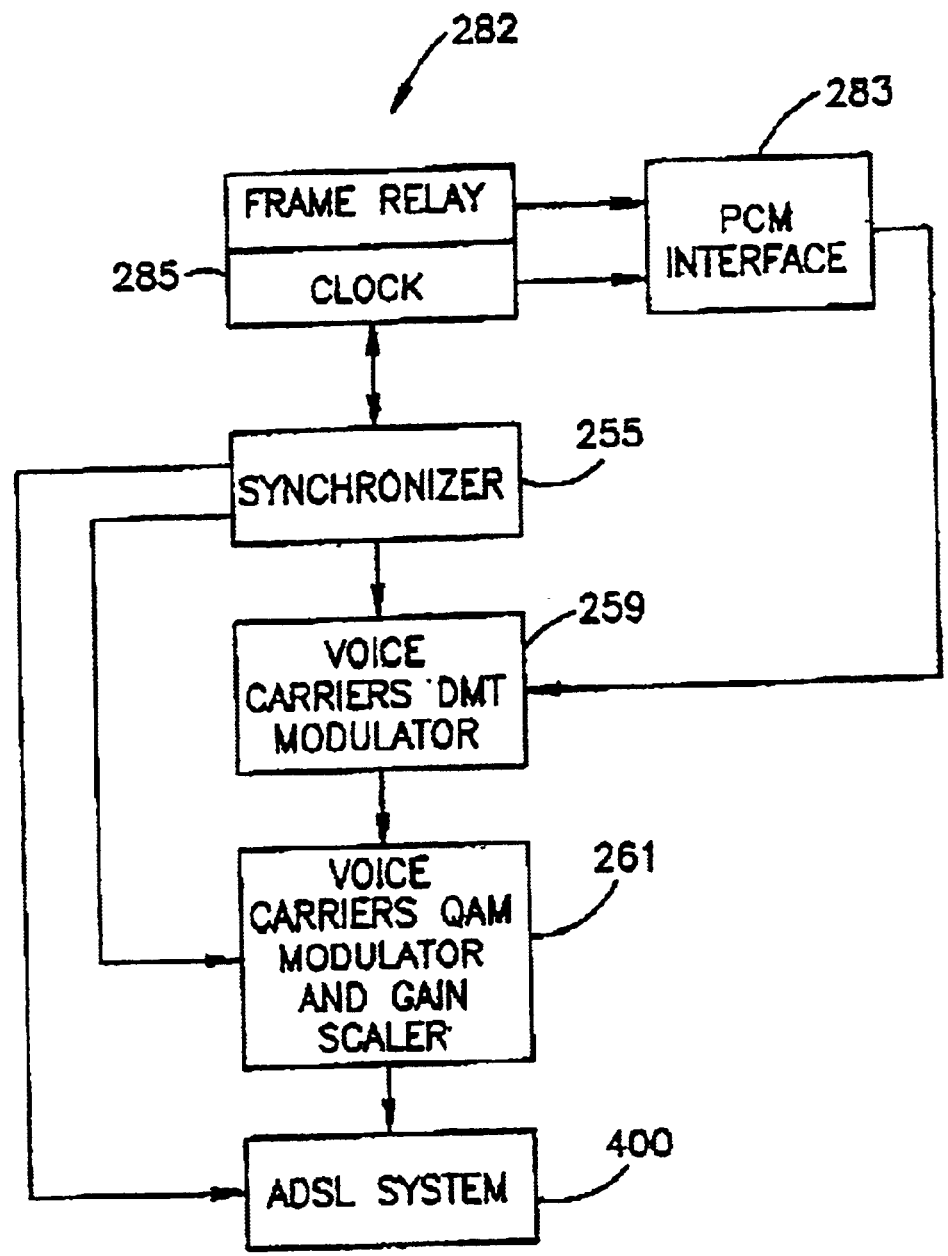
FIG. 11 is the incorporation of a PCM digital telephone signal from a frame relay.

Incorporating a digital voice channel of the CO: An ATU-C transmitter in accordance with the invention is well adapted to incorporate the electronic communication equipment of the CO, such as the PCM telephone switch (frame relay). According to a preferred embodiment of the invention, a stream of PCM telephone words of the CO is readily processed and communicated through the ADSL system. Data is processed in the same way as in example 1. FIG. 11 to which reference is now made, illustrates schematically the incorporation of a PCM digital telephone signal from a frame relay. A telephone signal comes in from frame relay 282 in the form of a 64 kbit/s PCM stream. It is sent to an input of a PCM interface 283 that synchronizes the DMT signal frames with the 8-bit PCM words. The 64 kb/s PCM stream is then distributed between two VCs or DMT signal as in a previous example. To synchronize the PCM stream with the DMT signal frames, a main 8-kHz clock 285 of the frame relay is connected to the synchronizer 255 and to the PCM interface 283. The synchronizer 255 is also connected to the ADSL 400 to synchronize between the data and the T1 voice source.

Incorporating several digital voice channels of the CO: An ATU-C transmitter in accordance with the invention is well adapted to incorporate electronic communication equipment of the CO, such as a PCM telephone switch (frame relay) having an ANSI T1 interface. According to a preferred embodiment of the invention, several streams of PCM telephone words of the CO are readily processed and communicated through the ADSL system.

Figure 12:
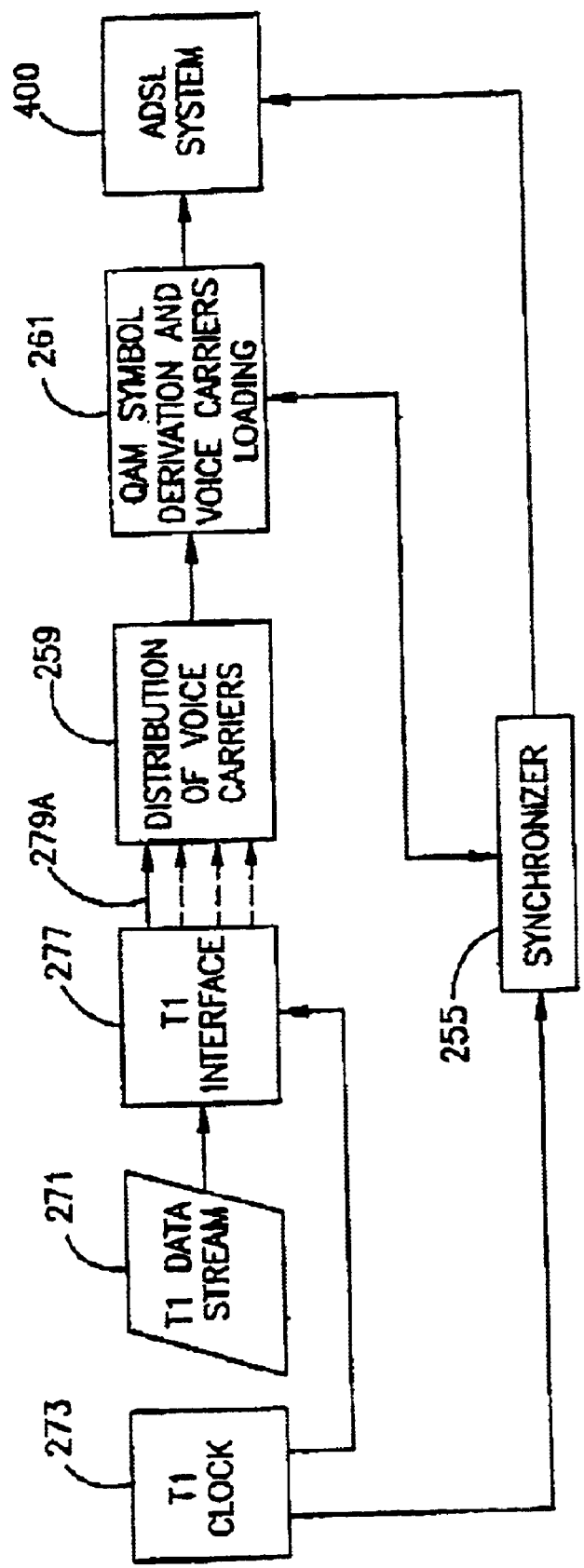
FIG. 12 schematically illustrates the incorporation into several channels of the system a data stream.

Data is processed in the same way as in the first example. FIG. 12 illustrates schematically the incorporation of a T1 format data stream containing several digital telephone channels into the ADSL system. First, the data stream 271 coming from a frame relay in T1 format is split into several channels by a T1 interface 277. Each such channel carries a sequence of 8 bit PCM words at a bit rate of 64 kb/s of a respective telephone channel. In the next step, each PCM stream 279 A, B, . . . is modulated by VCs DMT modulator 259 that distributes each 64 kb/sec PCM stream between two VCs of DMT signal. In the next step, a VCs QAM modulator and gain-scaler 261 transforms each 8-bit PCM word a into one 8-bit QAM symbol and provides a fixed 8-bit loading on each one of the VCs. A synchronization block 255 synchronizes T1 system clock 273 with the frames of the DMT line signal.

Figure 13:
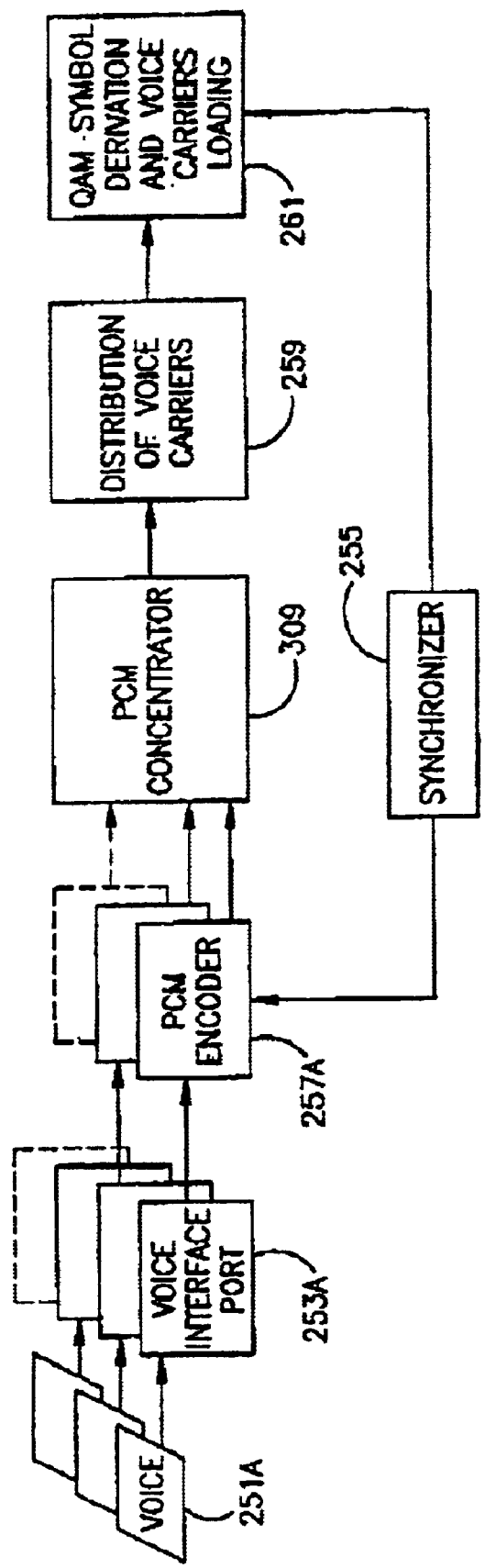
FIG. 13 is a block diagram illustrating the incorporation of several voice channels at a subscribers premise.

Incorporation of several voice channels at a subscriber premises: Data is processed and transmitted in an ATU-R in the same way as described in the first example. Referring now to FIG. 13, it will be seen that voice channel 251A is connected to a voice interface port 253A which is one of several identical ports, where the necessary amplifying and filtering is performed. A PCM encoder 257A is connected to the respective voice interface port 253A. Each PCM of the encoders has a sampling rate of 8 kHz and transforms an analog voice signal into a 64-kbit/sec sequence of 8-bit PCM words. The PCM coders use standard A-Law or μ-Law coding, which is the same one used in PCM telephone systems T1 or E1.

All PCM encoders are connected to a PCM concentrator 309. The output of concentrator 309 is connected to a VCs tone-ordering block 259 that distributes each 64 kbit/sec PCM stream between two VCs of DMT signal. A single PCM concentrator 309 is able to support several telephone channels simultaneously. Thus, for example, 8 PCM coders may be connected to one PCM concentrator that uses only four voice carriers to provide two telephone channels simultaneously.

While there has been described and illustrated methods for simultaneously conveying both data and voice signals over a twisted pair telephone line and various systems for carrying out these methods, it must be understood that many changes may be made thereon without departing from the spirit of the claims.

What is claimed is:

1. A method for transmitting voice and data signals simultaneously over a telephone subscriber wire pair, the method comprises:
    converting at least one voice signal into a corresponding sequence of n-bit digital words in synchronization with a discrete multi-tone (DMT) line signal, where n is an integer;
    assigning for voice transmission a portion of a plurality of carriers, each carrier in said portion being characterized by the ability to transmit a number of bits equal to or larger than n per Quadrature Amplitude Modulation (QAM) symbol,
    assigning other carriers of the DMT line signal for data transmission;
    converting said sequence of n-bit digital words into at least one sequence of n-bit QAM symbols where each QAM symbol has a real component constituted of odd bits of said n-bit digital words and an imaginary component constituted of even bits of said n-bit digital words; and
    sending said at least one sequence of QAM symbols in synchronization with said sequence of n-bit digital words on respective carriers assigned for voice transmission.

2. A method according to claim 1 and comprising reassigning several carriers of said assigned portion of other carriers for data conveyance when the respective voice channels are identified as silent.

3. A method according to claim 1 and wherein said n-bit digital words and said n-bit QAM symbols are 8-bit integers respectively.

4. A method according to claim 1 and comprising converting said at least one voice signal to a respective sequence of n-bit digital words by Pulse Code Modulation (PCM) encoding.

5. A method according to claim 1 and comprising associating said at least one voice signal with at least one respective telephone channel in analog or in digital form.

6. A method according to claim 1 and comprising reassigning several carriers of said assigned portion of other carriers for data carrying when the respective telephone channels are identified as silent.

7. A transmitter for a communication system which conveys voice signals and digital data over a telephone subscriber line, the transmitter comprising:
    at least one converter connectable to a corresponding external voice signal source for converting said voice signal into at least one sequence of n-bit digital words, where n is an integer;
    an assigner connected to each of said converters configured for assigning a portion of carriers of discrete multi-tone (DMT) signal for voice transmission;
    a constellation encoder configured for receiving said at least one sequence of n-bit digital words and being configured for modulating said portion of said carriers with at least one sequence of n-bit Quadrature Amplitude Modulation (QAM) symbols that correspond to said at least one sequence of n-bit digital words, where each QAM symbol has a real component constituted of odd bits of said n-bit digital words and an imaginary component constituted of even bits of said n-bit digital words;
    a synchronizer connected at least to said at least one converter and configured for effecting synchronization between frames of said DMT signal and said sequence of said n-bit digital words; and
    a loader configured for conveying said at least one sequence of QAM symbols in synchronization with said sequence of n-bit digital words on respective carriers assigned for voice transmission.

8. A transmitter according to claim 7 wherein said n-bit digital words are n-bit Pulse Code Modulation (PCM) words.

9. A transmitter according to claim 7 and comprising a processor configured for analyzing said voice signal and a carrier allocator connected to said processor and configured to receive instructions from said processor to reassign carriers formerly assigned to voice transmission to data transmission when said processor identifies the corresponding voice channel as being silent.

10. A transmitter according to claim 7 wherein said subscriber line is a twisted wire pair.

11. A transmitter according to claim 8 wherein a plurality of voice interface ports are connected to a corresponding number of PCM encoders, and wherein a PCM concentrator is connected to said PCM encoders and to said assigner.

12. A transmitter according to claim 7 and comprising a processor configured for analyzing telephone control signals and a carrier allocator connected to said processor and configured to receive instructions from said processor to reassign carriers formerly assigned to voice transmission to data transmission when said processor identifies the corresponding telephone channel as being silent.

13. A transmitter according to claim 8 and comprising a PCM voice interface port that is connected to external PCM telephone channel equipment of a telephone station, to said assigner and to said synchronizer for synchronizing said DMT frames with said at least one sequence of n-bit digital words of said external PCM telephone channel equipment.

* * * * *